(12) United States Patent
Panse et al.

(10) Patent No.: US 11,105,039 B2
(45) Date of Patent: *Aug. 31, 2021

(54) BURN PROTECTIVE MATERIALS

(71) Applicant: W. L. Gore & Associates, Inc., Newark, DE (US)

(72) Inventors: Dattatreya Panse, Lincoln University, PA (US); Allen B. Maples, Willimington, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/406,962

(22) Filed: May 8, 2019

(65) Prior Publication Data
US 2019/0264382 A1    Aug. 29, 2019

Related U.S. Application Data

(63) Continuation of application No. 12/432,436, filed on Apr. 29, 2009, now Pat. No. 10,364,527, which is a
(Continued)

(51) Int. Cl.
*D06M 23/16*  (2006.01)
*A41D 31/08*  (2019.01)
(Continued)

(52) U.S. Cl.
CPC .......... *D06M 23/16* (2013.01); *A41D 31/085* (2019.02); *B32B 3/08* (2013.01); *B32B 5/02* (2013.01); *B32B 5/22* (2013.01); *B32B 5/26* (2013.01); *B32B 7/14* (2013.01); *B32B 27/08* (2013.01); *B32B 27/12* (2013.01); *B32B 27/18* (2013.01); *B32B 27/281* (2013.01); *B32B 27/283* (2013.01); *B32B 27/322* (2013.01); *D06M 11/74* (2013.01); *D06M 15/564* (2013.01); *D06M 17/04* (2013.01); *D06M 23/04* (2013.01); *D06N 3/0063* (2013.01); *A62C 2/065* (2013.01); *B32B 2255/02* (2013.01); *B32B 2255/04* (2013.01); *B32B 2255/10* (2013.01); *B32B 2255/20* (2013.01); *B32B 2255/26* (2013.01); *B32B 2262/02* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/04* (2013.01); *B32B 2262/062* (2013.01); *B32B 2262/101* (2013.01);
(Continued)

(58) Field of Classification Search
CPC .... D06M 23/16; D06M 11/74; D06M 15/564; D06M 17/04; D06M 23/04; B32B 27/08; B32B 27/12; B32B 27/281; B32B 27/283; B32B 27/322; A41D 31/085
USPC ........................................................ 442/136
See application file for complete search history.

(56) References Cited

U.S. PATENT DOCUMENTS

| 5,258,216 A | * | 11/1993 | von Bonin | ............... B32B 5/30 428/102 |
| 5,401,793 A | * | 3/1995 | Kobayashi | ............. C09D 5/185 428/416 |
| 2007/0021023 A1 | * | 1/2007 | Altman | ................. D02G 3/185 442/364 |

* cited by examiner

*Primary Examiner* — Jennifer A Boyd
*Assistant Examiner* — Ricardo E Lopez
(74) *Attorney, Agent, or Firm* — Greenberg Traurig, LLP

(57) ABSTRACT

A method is described for reducing the afterflame of a flammable, meltable material. A textile composite is described comprising an outer textile comprising a flammable, meltable material, and a heat reactive material comprising a polymer resin-expandable graphite mixture.

13 Claims, 9 Drawing Sheets

Related U.S. Application Data continuation-in-part of application No. 11/923,125, filed on Oct. 24, 2007, now abandoned.

(51) Int. Cl.
| | |
|---|---|
| *B32B 5/26* | (2006.01) |
| *B32B 7/14* | (2006.01) |
| *B32B 27/08* | (2006.01) |
| *D06N 3/00* | (2006.01) |
| *B32B 27/12* | (2006.01) |
| *D06M 11/74* | (2006.01) |
| *D06M 15/564* | (2006.01) |
| *D06M 17/04* | (2006.01) |
| *D06M 23/04* | (2006.01) |
| *B32B 5/02* | (2006.01) |
| *B32B 5/22* | (2006.01) |
| *B32B 27/28* | (2006.01) |
| *B32B 27/32* | (2006.01) |
| *B32B 3/08* | (2006.01) |
| *B32B 27/18* | (2006.01) |
| *D06M 101/32* | (2006.01) |
| *D06M 101/34* | (2006.01) |
| *A62C 2/06* | (2006.01) |

(52) U.S. Cl.
CPC ..... *B32B 2262/106* (2013.01); *B32B 2262/14* (2013.01); *B32B 2264/0257* (2013.01); *B32B 2307/30* (2013.01); *B32B 2307/308* (2013.01); *B32B 2307/3065* (2013.01); *B32B 2307/546* (2013.01); *B32B 2307/554* (2013.01); *B32B 2307/718* (2013.01); *B32B 2307/724* (2013.01); *B32B 2307/7242* (2013.01); *B32B 2307/7265* (2013.01); *B32B 2307/75* (2013.01); *B32B 2571/00* (2013.01); *D06M 2101/32* (2013.01); *D06M 2101/34* (2013.01); *D06M 2200/30* (2013.01); *Y10T 428/24851* (2015.01)

US 11,105,039 B2

BURN PROTECTIVE MATERIALS

CROSS REFERENCE TO RELATED APPLICATIONS

This application is a continuation-in-part of application Ser. No. 11/923,125, filed Oct. 24, 2007.

BACKGROUND OF THE INVENTION

In order to reduce fire related burn injuries, protective clothing is desired for professionals working in hazardous environments where short duration exposure to fire is possible, such as search and rescue, and police. Protective gear for workers exposed to these conditions should provide some enhanced protection to allow the wearer to get away from the hazard quickly and safely, rather than to combat the hazard.

Traditionally, flame resistant protective garments have been made with an outermost layer of an ensemble (the flame-contacting layer) comprising non-combustible, non-melting fabric made of, for example, aramids, polybenzimidazole (PBI), poly p-phenylene-2,6-bezobisoxazole (PBO), modacrylic blends, polyamines, carbon, polyacrylonitrile (PAN), and blends and combinations thereof. These fibers may be inherently flame resistant but may have several limitations. Specifically, these fibers may be very expensive, difficult to dye and print, and may not have adequate abrasion resistance. Additionally, these fibers pick up more water and offer unsatisfactory tactile comfort as compared to nylon or polyester based fabrics.

For optimum user performance in environments with occasional flash fire exposure, a lightweight, breathable, waterproof, or water resistant garment with enhanced burn protection is desired. The cost of waterproof, flame resistant, protective clothing has been an important consideration for the large number of hazardous exposure applications outside fire protection, thereby precluding the use of typical, inherently flame resistant textiles such as those used in fire fighting community.

SUMMARY OF THE INVENTION

In one embodiment, a material is described that is suitable for use in garments, such as the outer layer of an outerwear garment, for workers in hazardous environments, which is breathable, waterproof, and flame resistant, while being lightweight, comfortable to wear, flexible, and affordable. In one embodiment a method is provided for reducing the afterflame of a flammable, meltable material to less than 20 seconds when tested according to the Horizontal Flame Test, comprising providing an outer textile comprising a flammable, meltable material, and comprising an inner side and an outer side; providing a heat reactive material comprising a polymer resin-expandable graphite mixture, wherein the expandable graphite has an expansion of at least 900 μm upon heating to 280° C. by applying the polymer resin-expandable graphite mixture to the inner surface of the outer textile material to form the heat reactive material, wherein the outer side of the outer textile is exposed to a flame.

In a further embodiment, a two layer textile composite having low afterflame time and low char length in Edge Ignition Test is formed that comprises a meltable, flammable outer textile layer, a thermally stable convective barrier, and a heat reactive material between the layers, where the heat reactive material comprises a polymer resin-expandable graphite mixture, and wherein the expandable graphite has an expansion greater than 9 cc/g and an endotherm greater than 100 J/g.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
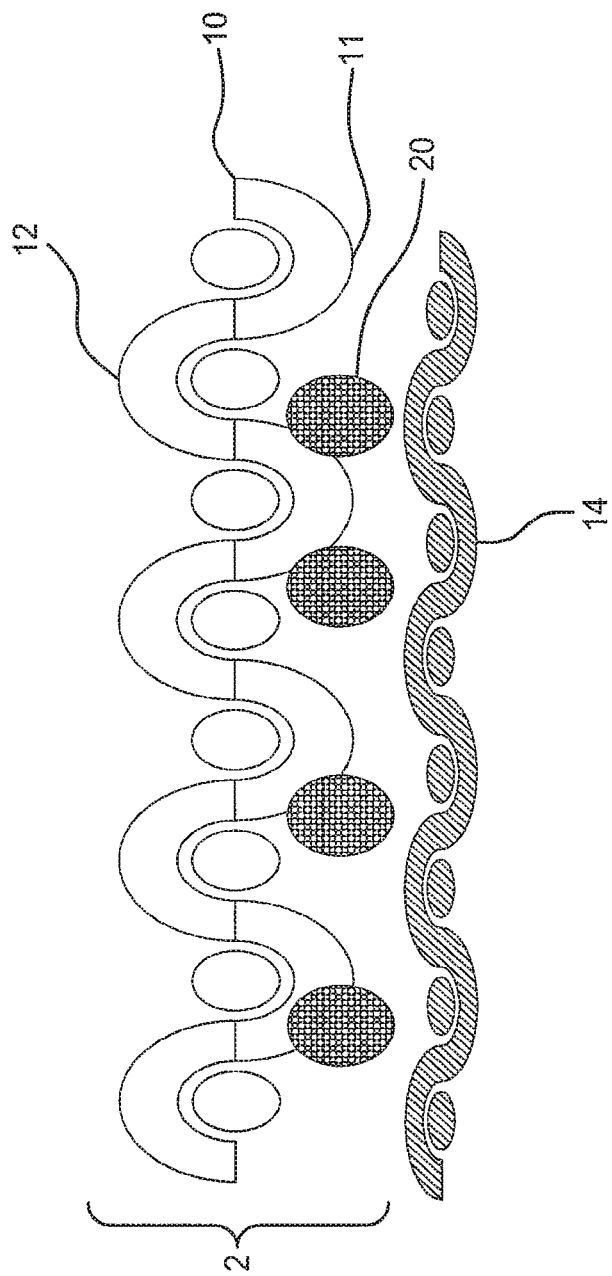
FIG. 1 is a schematic illustration of a cross-sectional view of one embodiment described herein.

In one embodiment, a method for reducing the afterflame of a flammable, meltable material is described herein. With reference to FIG. 1, a textile composite (2) comprising an outer textile (10) having a flammable, meltable material is provided with a heat reactive material (20) comprising a polymer resin-expandable graphite mixture. In one embodiment, the heat reactive material (20) is disposed on an inner side (11) of the outer textile (10). Upon exposure of the outer side (12) of the outer textile (10) to a flame, the outer textile provided with a layer of heat reactive material has an afterflame of less than 20 seconds, when tested according to the Horizontal Flame Test and Self-Extinguishing Test method provided herein.

In a further embodiment of the present invention, a thermally stable textile backer (14) is bonded, for example by the heat reactive material, to the inner side (11) of the outer textile (10) of the textile composite (2) (as illustrated in FIG. 1), and where in use, the outer side (12) of the outer textile (10) is oriented to come in contact with flame. Upon flame exposure, the meltable outer textile melts towards the heat reactive material. As the heat reactive material is expanding, it is believed the thermally stable textile backer holds the expanding heat reactive material in place to facilitate the absorption of melt of the meltable outer textile.

Materials suitable for use as a thermally stable textile backer (14) include, for example, textiles which are not meltable according to the Melting and Thermal Stability Test as presented herein. Examples of suitable thermally stable textile backers include aramids, flame resistant (FR) cottons, PBI, PBO, FR rayon, modacrylic blends, polyamines, carbon, fiberglass, PAN, polytetrafluoroethylene (PTFE), and blends and combinations thereof. Non-thermally stable textiles that are meltable according to the Melting and Thermal Stability Test are not suitable as thermally stable textile backer materials for use herein. Textiles which are meltable according to the Melting and Thermal Stability Test are suitable as an outer textile including but not limited to nylon 6, nylon 6,6, polyester, and polypropylene.

In another embodiment, a method is provided for reducing the break-open time of a textile composite. With reference to one embodiment illustrated in FIG. 2, a textile composite (2) is provided comprising an outer textile (10) having a meltable material which may be either flammable or non-flammable. A thermally stable convective barrier (30) is further provided next to an inner side (11) of the outer textile (10), and a heat reactive material (20) is provided therebetween. In one method, a textile composite (2) is formed having a break-open time that is increased by at least 20 seconds over a textile composite constructed of substantially the same materials in which no heat reactive material is incorporated, when tested according to the method for Horizontal Flame Test described herein. Embodiments comprising textile composites may be made according to the methods herein and having an outer textile (10) comprising a meltable material and a heat reactive material (20) wherein the textile composite has an increased break-open time that is greater than about 30 seconds when tested according to the Horizontal Flame test method described herein.

In one embodiment, a method for making a textile composite is provided in which a textile composite having an outer textile (10) which comprises a material that is both meltable and flammable, and which further comprises a thermally stable convective barrier (30) and a heat reactive material (20) between the outer textile and the thermally stable convective barrier, has an increase in break-open time and a decrease in afterflame, when compared to substantially the same textile composites formed without a heat reactive material. The break-open and afterflame times are tested according to the test methods for Horizontal Flame Test and Self-Extinguishing Test, respectively, provided herein. In one such embodiment, a textile composite has a break-open time that is greater than 20 seconds and an afterflame of less than 20 seconds.

Figure 3:
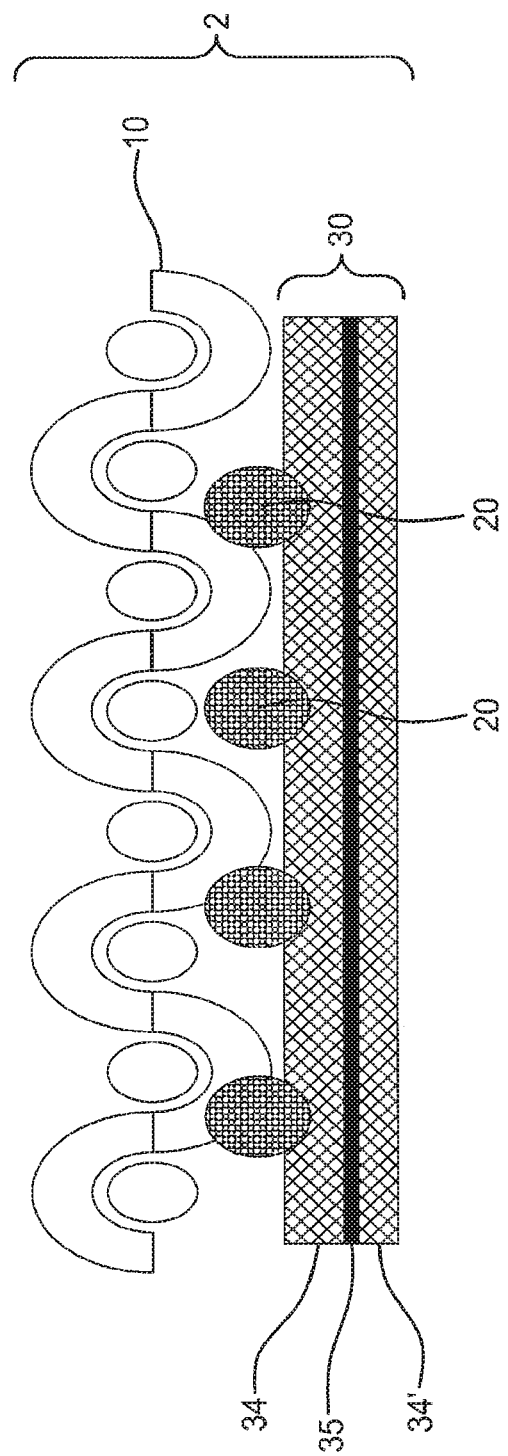
FIG. 3 is a schematic illustrating one embodiment described herein.

In a further embodiment, as exemplified in FIG. 3, the textile composite (2) may comprise a multilayer thermally stable convective barrier (30). The thermally stable convective barrier (30) may comprise two or more layers of a thermally stable film (34 and 34') and, for example a polymer layer (35) therebetween. The polymer layer (35) may be waterproof or air impermeable or both.

Figure 4:
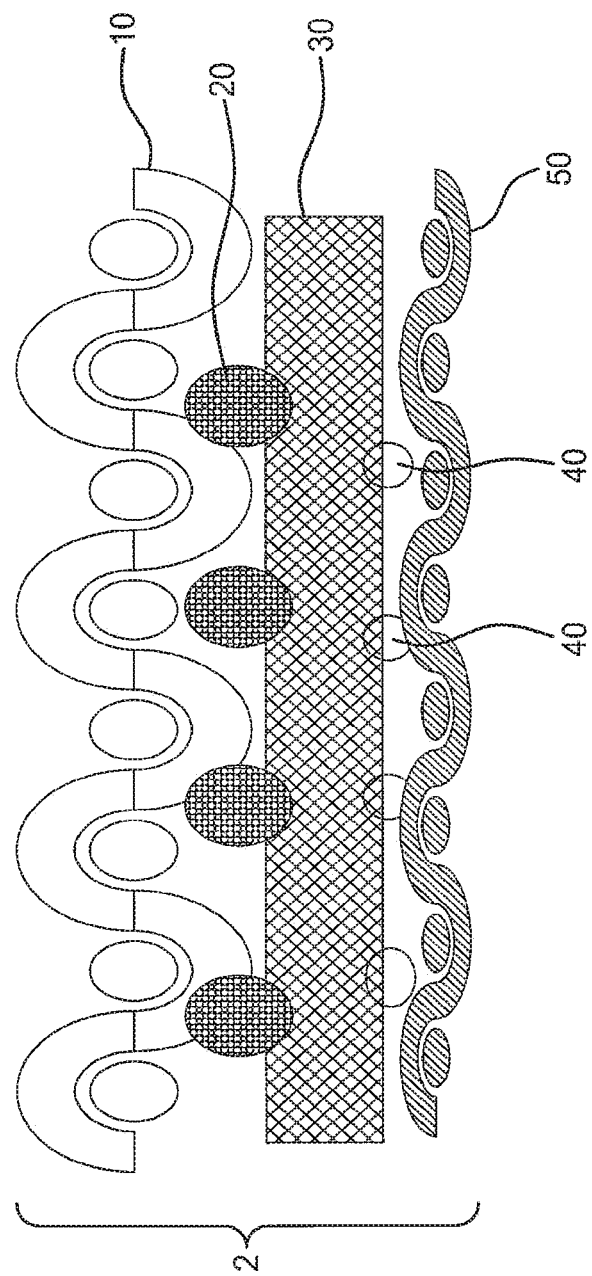
FIG. 4 is a schematic illustration of another embodiment described herein.

In another embodiment, such as the one illustrated in FIG. 4, the textile composite (2) may further comprise a textile backer (50) positioned on a side of the thermally stable convective barrier (30) that is opposite the heat reactive material (20). The textile backer (50) may be attached to the textile composite with an adhesive (40). Preferably, the backer textile (50) is a thermally stable textile backer, such as a material which passes Melting and Thermal Stability Test described herein.

A method is also provided for reducing the predicted percent body burn after exposure to flame when tested according to the ASTM F1930 Garment Flammability Test (Pyroman) described herein. The method comprises providing a textile composite comprising an outer textile comprising a meltable material and a thermally stable convective barrier, having a heat reactive material between the outer textile and the thermally stable convective barrier. The method further comprises constructing a garment from the textile composite wherein the outer textile is oriented to face away from the body of the mannequin and toward the source of the flame and in contact with flame. After a 4 second exposure during the Garment Flammability Test, a reduction in body burn, afterflame and melt dripping is achieved compared to a garment constructed similarly and with substantially the same materials but without a heat reactive material between the outer textile and the thermally stable convective barrier. In certain embodiments, melt dripping is not observed, afterflame is reduced by about 20 seconds and/or a garment having the heat reactive material has a predicted percent body burn that is about 5 percentage points lower than a garment constructed without the heat reactive material.

Figure 6:
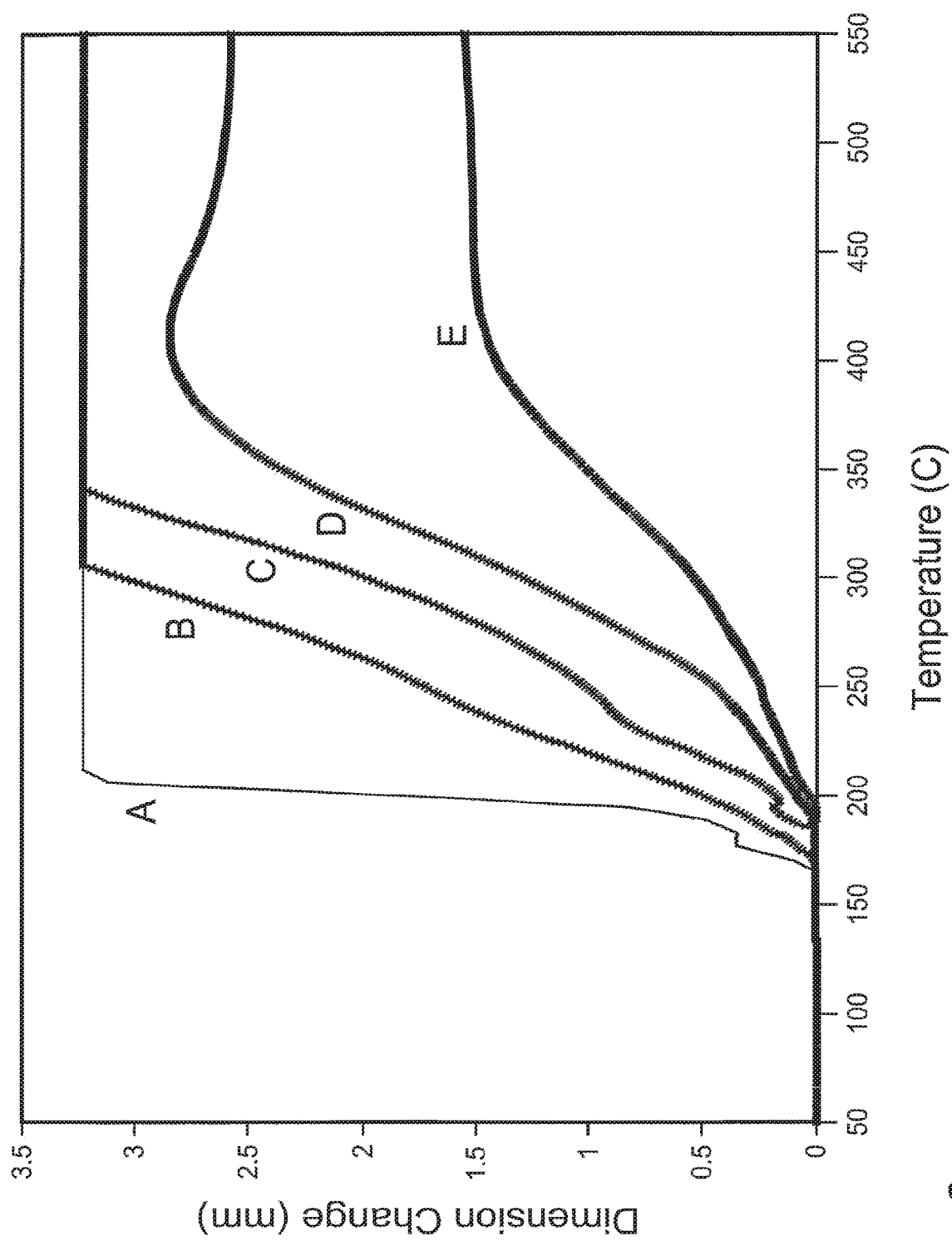
FIG. 6 is a graphical representation of the expansion of expandable graphites.

FIG. 6 is a graphic representation of the TMA expansion rates of several expandable graphites (A=Nyagraph 351 available from Nyacol Nano technologies, Inc.; B=3626 available from Asbury Graphite Mills Inc.; C=3494 Asbury Graphite Mills, Inc.; D=Nyagraph 35 available from Nyacol Nano technologies, Inc.; E=3538 available from Asbury Graphite Mills, Inc.). An expandable graphite most suitable for use in methods disclosed herein has average expansion rate of at least 9 μm/° C. between about 180° C. and 280° C. Depending on the desired properties of the textile composite, it may be desirable to use an expandable graphite having an expansion rate greater than 9 μm/° C. between about 180° C. and 280° C., or on expansion rate greater than 12 μm/° C. between about 180° C. and 280° C., or an expansion rate greater than 15 μm/° C. between about 180° C. and 280° C. One expandable graphite suitable for use in certain embodiments expands by at least 900 microns in TMA Expansion Test described herein when heated to about 280° C. Another expandable graphite suitable for use in certain embodiments expands by at least 400 microns in TMA Expansion Test described herein when heated to about 240° C. If tested using the Furnace Expansion Test described herein, expandable graphite suitable for use in composites and methods described herein has an average expansion of at least 9 cc/g at 300° C. In one example, expandable graphite B (3626 available from Asbury Graphite Mills, Inc.) has an average expansion of about 19 cc/g at 300° C., whereas expandable graphite E (3538 available from Asbury Graphite Mills, Inc.) has an expansion of only about 4 cc/g at 300° C., when tested by the Furnace Expansion Test described herein.

In certain embodiments, composites are formed comprising expandable graphite having good expansion and an endotherm of at least about 100 J/g when tested according to the DSC Endotherm Test method described herein. In other embodiments, it may be desirable to use expandable graphite with endotherm greater than or equal to about 150 J/g, greater than or equal to about 200 J/g, or an endotherm greater than or equal to about 250 J/g. In one embodiment, a composite textile having a meltable outer textile and an expandable graphite having an expansion greater than 900 μm at 280° C. and an endotherm greater than 100 J/g is formed having an average afterflame value of less than 20 seconds, average char length of less than a 20 cm, or both, when tested according to the Edge Ignition Test described herein. In one embodiment, a composite is formed having a meltable outer textile, a thermally stable convective barrier comprising expanded PTFE or a thermally stable textile backer, and a heat reactive material comprising a polymer resin-expandable graphite mixture between the meltable outer textile and the thermally stable convective barrier or thermally stable textile backer. The polymer resin and an expandable graphite having an endotherm of at least 100 J/g, is blended to form a mixture that is applied in a discontinuous pattern to either material on a surface interface. In other embodiments, textile composites can be formed comprising polymer resin-expandable graphite mixtures wherein the textile has an average afterflame of less than 10 seconds, or less than 2 seconds; textile composites may be formed having an average char length less than 15 cm, or less than 10 cm, when tested according to the Edge Ignition Test.

Expandable graphite particle size suitable for present invention should be chosen so that the polymer resin-expandable graphite mixture may be applied with the selected application method. For example, where the polymer resin-expandable graphite mixture is applied by a gravure printing techniques, the expandable graphite particle size should be small enough to fit in the gravure cells.

Polymer resins having a melt or softening temperature of less than 280° C. are suitable for use in disclosed embodiments. In one embodiment polymer resins used in methods described herein are sufficiently flowable or deformable to allow the expandable graphite to expand substantially upon heat exposure at or below 300 C, preferably at or below 280° C. Other polymer resins suitable for use in the heat reactive material allow the expandable graphite to sufficiently expand at temperatures below the pyrolysis temperature of the meltable outer textile. It may be desirable that the extensional viscosity of a polymer resin is low enough to allow for the expansion of expandable graphite and high enough to maintain the structural integrity of the heat reactive material after expansion of the mixture of polymer resin and expandable graphite. In another embodiment a polymer resin is used which has a storage modulus between $10^3$ and $10^8$ dyne/cm$^2$ and Tan delta between about 0.1 and about 10 at 200° C. In another embodiment a polymer resin is used that has a storage modulus between $10^3$ and $10^6$ dyne/cm$^2$. In another embodiment a polymer resin is used that has a storage modulus between $10^3$ and $10^4$ dyne/cm$^2$. Polymer resins suitable for use in some embodiments have a modulus and elongation at around 300 C or less, suitable to allow the graphite to expand. Polymer resins suitable for use in some embodiments are elastomeric. Other polymer resins suitable for use in some embodiments are crosslinkable, such as crosslinkable polyurethane such as Mormelt R7001E (from Rohm & Haas). In other embodiments, suitable polymer resins are thermoplastic having a melt temperature between 50° C. and 250° C., such as Desmomelt VP KA 8702 (from Bayer Material Science LLC). Polymer resins suitable for use in embodiments described herein comprise polymers which include but are not limited to polyesters, thermoplastic polyurethanes and crosslinkable polyurethanes, and combinations thereof. Other polymer resins may comprises one or more polymers selected from polyester, polyamide, acrylic, vinyl polymer, polyolefin. Other polymer resins may comprise silicone or epoxy. Flame retardant materials optionally may be incorporated in the polymer resin, such as melamine, phosphorous, and brominated compounds, metal hydroxides such as alumina trihydrate (ATH), borates, and combinations thereof.

In some embodiments of the polymer resin-expandable graphite mixture, the mixture, upon expansion, forms a plurality of tendrils comprising expanded graphite. The total surface area of the polymer resin-expandable graphite mixture increases significantly when compared to the same mixture prior to expansion. In one embodiment, the surface area of the mixture is increased at least five times after expansion. In another embodiment, the surface area of the mixture is increased at least ten times after expansion. In addition, tendrils will often extend outward from the expanded mixture. Where the polymer resin-expandable graphite mixture is situated on a substrate in a discontinuous form, the tendrils will extend to at least partially fill the open areas between the discontinuous domains. In a further embodiment, the tendrils will be elongated, having a length to width aspect ratio of at least 5 to 1. In one embodiment, where a composite comprises a meltable outer textile, a thermally stable textile backer or a thermally stable convective barrier and heat reactive material comprising a polymer resin-expandable graphite mixture applied in a pattern of discontinuous forms, the heat reactive material expands forming tendrils that are loosely packed after expansion creating voids between the tendrils, as well as space between the pattern of the expanded polymer resin-expandable mixture. Upon exposure to flame, the meltable outer textile melts and generally moves away from the open areas between the discontinuous forms of the heat reactive material. The thermally stable textile backer (or convective barrier) supports the heat reactive material during expansion and the melt of the meltable outer textile is absorbed and retained by the expanding heat reactive material during melting. By absorbing and retaining the melt, composites can be formed that exhibit no melt-dripping and flammability is suppressed. It is believed that where the thermally stable textile backer (or convective barrier) supports the expanding material during melt absorption, the thermally stable textile backer (or convective barrier) is protected from breaking open and hole formation. The increased surface area of the heat reactive material upon expansion allows for absorption of the melt from the meltable textile by the expanded heat reactive material upon exposure to flame.

The polymer resin-expandable graphite mixture may be produced by a method that provides an intimate blend of polymer resin and expandable graphite, without causing substantial expansion of the expandable graphite. Suitable mixing methods include but not limited to paddle mixer, blending and other low shear mixing techniques. In one method, the intimate blend of polymer resin and expandable graphite particles is achieved by mixing the expandable graphite with a monomer or prepolymer prior to polymerization of the polymer resin. In another method, the expandable graphite may be blended with a dissolved polymer, wherein the solvent is removed after mixing. In another method, expandable graphite is blended with a hot melt polymer at a temperature below the expansion temperature of the graphite and above the melting temperature of the polymer. In methods which provide an intimate blend of polymer resin and expandable graphite particles or agglomerates of expandable graphite, the expandable graphite is coated or encapsulated by the polymer resin prior to expansion of the graphite. In other embodiments, the intimate blend is achieved prior to applying the polymer resin-expandable graphite mixture to a substrate.

The polymer resin-expandable graphite mixture comprises less than or equal to about 50 wt %, or less than or equal to about 40 wt %, or less than or equal to about 30 wt % expandable graphite based on the total weight of the polymer resin-expandable graphite mixture, and the balance substantially comprising the polymer resin. In other embodiments, the expandable graphite comprises less than or equal to about 20 wt %, or less than or equal to about 10 wt %, or less than or equal to about 5 wt % of the mixture, and the balance substantially comprising the polymer resin. Generally, from about 5 wt % to 50 wt % of expandable graphite based on the total weight of the polymer resin-expandable graphite mixture, is desired. In some embodiments, desirable flame resistance performance may be achieved with even lower amounts of expandable graphite. Loadings as low as 1% may be useful. Depending on the properties desired and the construction of the resulting textile composites, other levels of expandable graphite may also be suitable for other embodiments. Other additives such as pigments, fillers, antimicrobials, processing aids and stabilizers may also be added to the mixture.

The polymer resin-expandable graphite mixture may be applied to the outer textile (10) of the textile composite to form the heat reactive material (20) such as exemplified in FIG. 1. The heat reactive material may be applied as a continuous layer. However, where enhanced breathability and/or hand is desired, the polymer resin-expandable graphite mixture may be applied discontinuously to form a layer of heat reactive material having less than 100% surface coverage.

A discontinuous application may provide less than 100% surface coverage by forms including but not limited to dots, grids, lines, and combinations thereof. In some embodiments with discontinuous coverage, the average distance between adjacent areas of the discontinuous pattern is less than the size of an impinging flame. In some embodiment with discontinuous coverage, the average distance between adjacent areas of the discontinuous pattern is less than 10 mm, or less than 5 mm, or preferably less than 3.5 mm, or 2.5 mm or less, or 1.5 mm or less, or 0.5 mm or less. For example, in a dot pattern printed onto a substrate, the spacing between the dots would be measured. An average distance between adjacent areas of the discontinuous pattern may be greater than 40 um, or greater than 50 um, or greater than 100 um, or greater than 200 um, depending on the application. Average dot spacing measured to be greater than 200 μm and less than 500 μm is useful in some composites described herein.

Figure 9A:
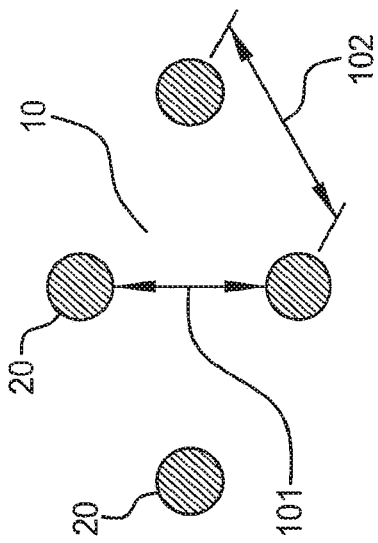
FIG. 9a is a schematic illustration of a pattern applied as discrete dots.
Figure 9B:
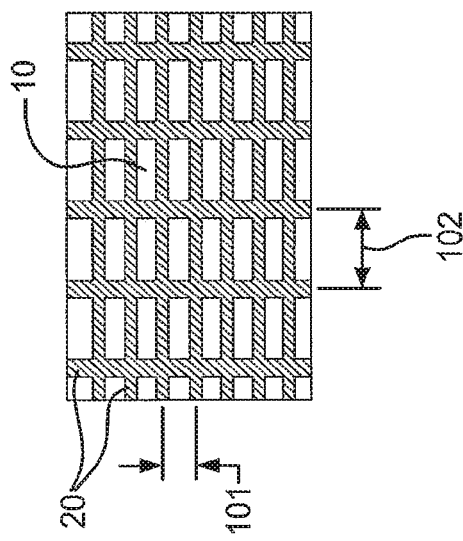
FIG. 9b is a schematic illustration of a pattern applied as a grid.
Figure 9C:
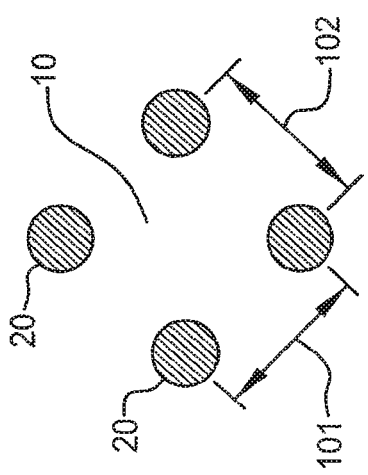
FIG. 9c is a schematic illustration of a pattern applied as discrete dots.

Pitch may also be used, for example, in combination with surface coverage as a way to described the laydown of a printed pattern. In general, pitch is defined as the average center-to-center distances between adjacent forms such as dots, lines, or gridlines of the printed pattern. The average is used, for example, to account for irregularly spaced printed patterns, such as shown in FIGS. 9b and 9c. In one embodiment, the polymer resin-expandable graphite mixture (20) can be applied discontinuously in a pattern with a pitch and surface coverage that provides superior flame retardant performance compared to a continuous application of heat reactive mixture having a laydown of equivalent weight of the polymer resin-expandable graphite mixture. For example, as shown in FIGS. 9a, 9b, and 9c, the pitch is defined as the average of the center-to-center distances (101 and 102) between adjacent dots or grid lines. In some embodiments, the pitch is greater than 500 μm, or greater than 1000 μm, or greater than 2000 μm, or greater than 5000 μm. A pattern of heat reactive material having a pitch between 500 μm and 6000 μm is suitable for use in most composites described herein.

In embodiments where properties such as hand, breathability, and/or textile weight are important, a surface coverage of greater than about 25%, and less than about 90%, or less than about 80%, or less than about 70%, or less than about 60%, or less than about 50%, or less than about 40%, or less than about 30% may be used. In certain embodiments where, for example, greater flame resistant properties are needed, it may be desired to have a surface coverage between about 30% and 80% of the heat reactive material on a surface of a composite layer with pitch between 500 μm and 6000 μm.

Figure 5B:
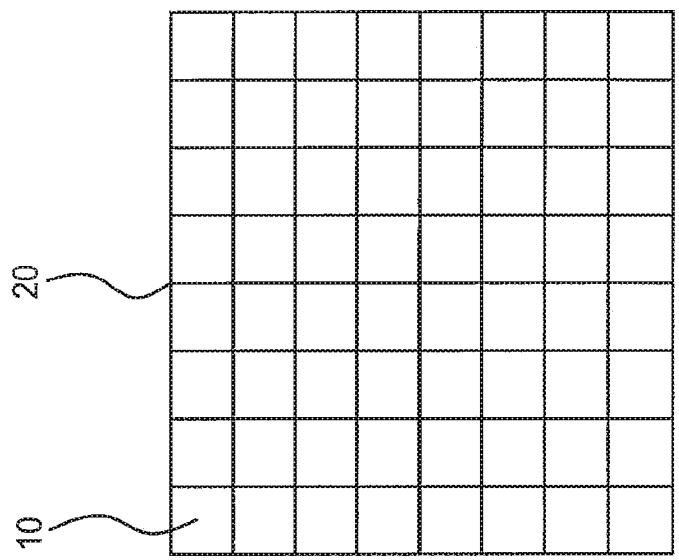
FIG. 5b is a schematic illustration of one embodiment of a pattern of polymer resin-expandable graphite mixture applied in a grid.
Figure 5A:
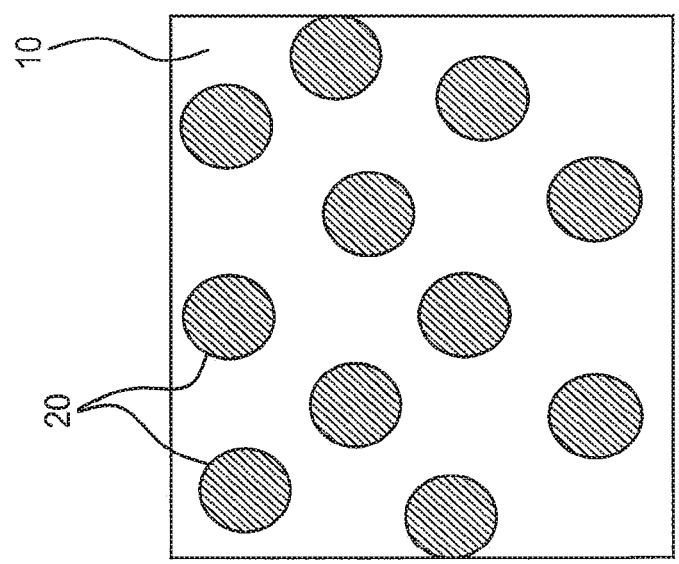
FIG. 5a is a schematic illustration of a polymer resin-expandable graphite applied as discrete dots.

One method for achieving a coverage of less than 100% comprises applying the polymer resin-expandable graphite mixture by printing the mixture onto a surface of the construct by, for example gravure printing. FIGS. 5a and 5b illustrate examples in which the layer of heat reactive material (20) is provided in patterns of dots (5A) and grids (5B) as the polymer resin-expandable graphite mixture (20) is applied discontinuously to form a heat reactive material, for example to a substrate (10) such as a thermally stable convective barrier or to the inner side of an outer textile. The polymer resin-expandable graphite mixture may be applied to achieve an add-on weight of between about 10 gsm to about 100 gsm of the mixture. In some embodiments, the mixture is applied to the substrate to achieve an add-on weight of less than 100 gsm, or less than 75 gsm, or less than 50 gsm, or less than 25 gsm.

In one discontinuous application, such as in the application of discrete dots (20) in FIG. 5A, the polymer resin-expandable graphite mixture is applied to a substrate forming a layer of heat reactive material (20) in the form of a multiplicity of discrete pre-expansion structures comprising the polymer resin-expandable graphite mixture. Upon expansion, the discrete dots form a multiplicity of discrete expanded structures having structural integrity thereby providing sufficient protection to a textile composite to achieve the enhanced properties described herein. By structural integrity it is meant that the heat reactive material after expansion withstands flexing or bending without substantially disintegrating or flaking off the substrate, and withstands compression upon thickness measurement when measured according to the Thickness Change Test described herein.

The polymer resin-expandable graphite mixture may be applied in other forms in addition to dots, lines, or grids. Other methods for applying the polymer resin-expandable graphite mixture may include screen printing, or spray or scatter coating or knife coating, provided the polymer resin-expandable graphite mixture may be applied in a manner in which the desired properties upon exposure to heat or flame are achieved.

Figure 2:
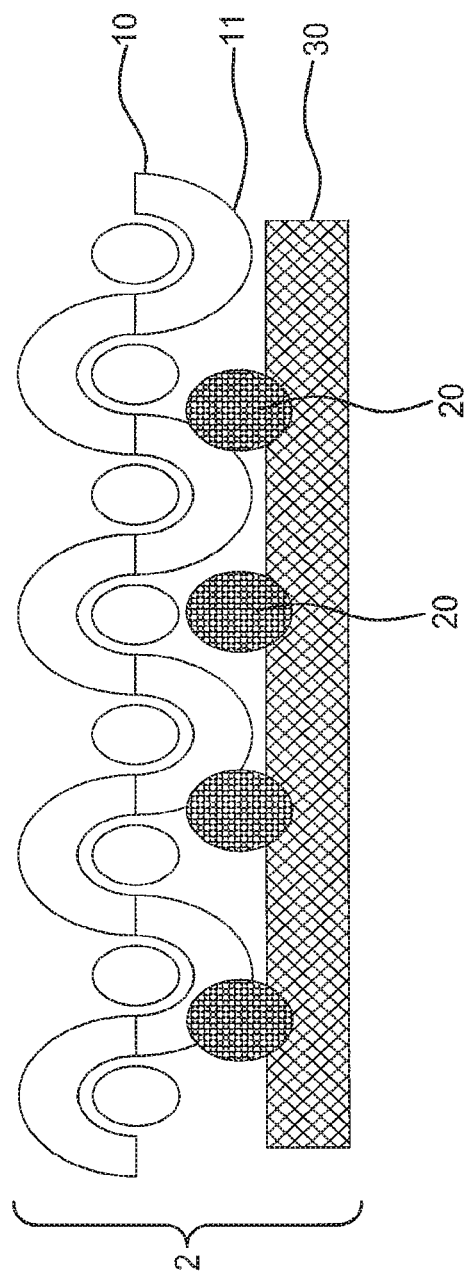
FIG. 2 is a schematic illustration of cross-sectional view of another embodiment described herein.

In one embodiment comprising a thermally stable convective barrier, as exemplified in FIG. 2, the layer of heat reactive material (20) may be disposed on the outer textile (10) or on the thermally stable convective barrier (30). In one preferred method, the polymer resin-expandable graphite mixture is applied in a manner in which the mixture provides a good bond between the thermally stable convective barrier and the outer textile. In embodiments where the textile composite comprises a laminate construction, the polymer resin-expandable graphite mixture is applied as an adhesive, for example, to bond the inner side of outer textile layer (10) and the thermally stable convective barrier (30) forming a layer of heat reactive material between the outer textile layer (10) and the thermally stable convective barrier (30). In another method, the polymer resin-expandable graphite mixture is applied to the composite forming a layer of heat reactive material which may optionally be disposed at least partially within surface pores or surface voids of one or both of the layers (10 and 30).

The methods described provide enhanced properties which are particularly beneficial to textile composites comprising an outer textile (10) which comprises materials comprising non-flammable meltable materials or flammable meltable materials. Meltable materials are materials that are meltable when tested according to the Melting and Thermal Stability test. Materials are tested with the Vertical Flame Test for Textiles to determine whether they are flammable or nonflammable. In certain embodiments, the outer textile comprises a polyamide such as nylon 6 or nylon 6,6, and polyester, polyethylene, and combinations thereof. Preferred textile composites are comprised of outer textiles which are knit or woven, and the outer textile has a weight of less than or equal to about 10.0 oz/yd$^2$, preferably between 1 oz/yd$^2$ and 10 oz/yd$^2$. Alternately, the outer textile weight is between 1 oz/yd$^2$ and 5.0 oz/yd$^2$.

Meltable non-flammable textiles include, for example, phosphinate modified polyester (such as materials sold under the trade name Trevira® CS and Avora® FR). Some meltable, non-flammable textile are not typically intended for use in flame resistant laminates intended for garment applications, because when constrained in traditional laminate form, the textile cannot readily shrink away from flames resulting in continued burning. However, it has been found that when formed as a textile composite further comprising a thermally stable textile or thermally stable convective barrier and a heat reactive material between the layers, the textile composites are suitable for use in flame resistant laminate applications. In one embodiment, a textile composite in the form of a laminate comprising a meltable, non-flammable outer textile, and a thermally stable textile or thermally stable convective barrier that comprises a discontinuous pattern of heat reactive material between the layers, has an afterflame less than 5 seconds, char length less than 10 cm, when tested according to the Edge Ignition Test.

Thermally stable convective barrier materials may be provided to the textile composite to further enhance the performance of the textile composite upon exposure to flame or heat. In some embodiments, a thermally stable convective barrier having a thickness of less than 1 mm and a hand less than 100, when measured by the Flexibility or Hand Measurement Test described herein, may be selected to achieve a particular thinness and hand of the resulting composite. Thermally stable convective barrier materials comprise materials such as a heat stable film, and include materials such as polyimide, silicone, PTFE, such as dense PTFE or expanded PTFE. The thermally stable convective barrier prevents the convective heat transfer to the layers behind it when exposed to a convective heat source. In addition, the thermally stable textile and the thermally stable convective barrier facilitates melt absorption. Barrier materials not suitable for use in composites described herein include films lacking sufficient thermal stability, such as many breathable polyurethane films and breathable polyester films (such as Sympatex®, particularly thermoplastics). Convective barriers for use in embodiments described herein have a maximum air permeability of less than about 5 Frazier after thermal exposure when tested as per the Convective Barrier Thermal Stability Test method described herein. Preferably, a convective barrier has an air permeability after thermal exposure of less than 3 Frazier.

Textile composites made according to the methods described herein preferably have an MVTR greater than about 1000, or greater than about 3000, or greater than about 5000, or greater than about 7000, or greater than about 9000, or greater than about 10000, or higher. Preferred textile composites have a break open time greater than about 50 seconds, greater than about 60 seconds, or even greater than 120 seconds when tested according to the methods for Horizontal Flame Test described herein. Preferable textile composites also have an afterflame less than 20 seconds when tested according to the Horizontal Flame Test and Self-Extinguishing Test methods described herein. Further preferred textile composites have an afterflame less than 15 seconds, or less than 10 seconds, or less than 5 seconds, when tested by the Horizontal Flame Test and Self-Extinguishing Test. Preferred textile composites exhibit substantially no melt dripping behavior when tested in the Horizontal Flame test.

A flexible textile composite is a composite that is suitable for example, in apparel or garment applications, such as protective coveralls, hazardous material suits, jackets and gloves, and tents. Flexible textile composites for use in garments, for example, can be made having a Hand less than 2000, when measured according to the test described herein for Flexibility or Hand Measurement. In other embodiments, a textile composite is formed according to the methods described herein, having a hand less than about 500, or less than 300, or less than about 250, or less than about 200, and having an afterflame of less than about 20 seconds, or less than about 15 seconds or less than about 10 seconds, or an after-flame of about zero, when measured according to the tests described herein for Flexibility and Hand, and Horizontal Flame Test and Self-Extinguishing Test. In one embodiment, a textile composite is formed that has an afterflame of less than 20 seconds and a char length of less than 20 cm when tested by the Edge Ignition Test. In another embodiment, a textile composite is formed having an afterflame of less than 20 seconds and have no hole formation when tested by the Surface Impingement FlameTest described herein. In some embodiments, lightweight textile composites are formed having a weight of about less than 15 oz/yd$^2$, or less than about 10 oz/yd$^2$, or less than about 8 oz/yd$^2$, or less than about 5 oz/yd$^2$.

In some embodiments, textile composites are made according to methods described herein having the ability to suppress afterflame even when contaminated with flammable liquid contaminants, such as oils, fuels, or hydrocarbon-based solvents. In one embodiment, a textile composite having a meltable outer textile is formed that when contaminated with flammable liquid contaminant has an afterflame of less than 10 seconds, no hole formation, or both, when tested according to the Surface Impingement Flame Test described herein. In another embodiment, a composite having a meltable, flammable outer textile is formed that has an afterflame of less than 5 seconds, or less than 2 seconds after contamination by flammable liquid. It is believed that the melt absorption property of meltable textile composites of this invention leads to afterflame suppression in a meltable textile composite contaminated by flammable liquid. Without wishing to be bound by theory, it is believed that the meltable textile adsorbs the flammable liquid and carries it into the expanding heat reactive material, thereby leading to suppression of afterflame.

In an embodiment of the current invention, the meltable materials, for example an outer textile (10), described may combine with the expanding heat reactive material (20) during exposure to heat and/or flame that is sufficient to melt the meltable materials to form an expanded composite. In some embodiments, the meltable material may be sufficiently drawn into or absorbed on at least a portion of the expanding heat reactive material. The resulting expanded composite may comprise the elongated tendrils of the heat reactive material and the meltable material. In some embodiments, the expanded composite has structural stability when tested in accordance to the Thickness Change Test. In one embodiment, the textile composite of the present invention changes thickness upon heat exposure. The thickness of the textile composite after expansion is at least 1 mm greater than the thickness of the textile composite prior to expansion.

In one embodiment, a material is described that is suitable for use in garments for workers in hazardous environments, which is breathable, waterproof, and flame resistant, while being lightweight, flexible, and comfortable to wear.

Without intending to limit the scope of the present invention, the following examples illustrate how the present invention may be made and used:

Test Methods

Horizontal Flame Test

Figure 7:
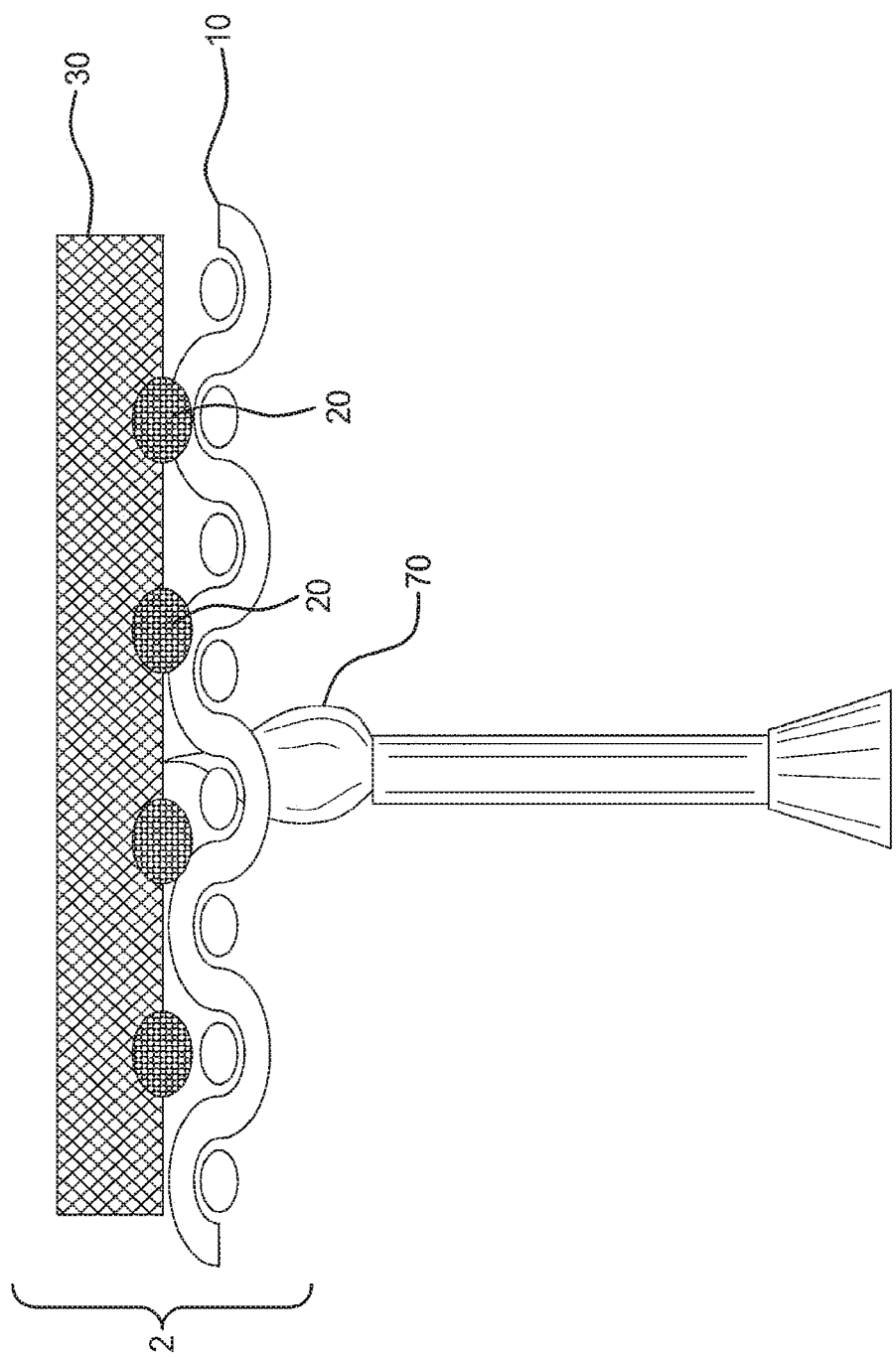
FIG. 7 is a schematic representation of samples tested by the Horizontal Flame test described herein.

This test is modeled generally after MIL-C 83429B. A 75 mm by 250 mm textile composite sample (3 inch by 10 inch) was clamped in a steel fixture (400 mm long by 75 mm wide with a center window of about 350 mm long and 50 mm wide) using binder clips. The sample was clamped in a manner that secured the edges of the textile composite without obstructing the area of textile composite present in the window of the steel clamping fixture. The sample in fixture was placed horizontally at a height of about 40 mm in a 90 mm flame (based on butane at 2 psi using a Meeke burner). FIG. 7 depicts the orientation of the textile composite construction 2, wherein the meltable outer textile 10 is oriented adjacent to the flame 70 during testing. The sample is exposed to the flame and the time is recorded until the convective barrier breaks open (or a hole forms in the face textile in case where convective barrier is not used), either by cracking or the formation of a hole, and light from the flame is evident when viewing through the crack or opening in the material. The sample is subsequently removed from the flame. The time recorded is referred to as the horizontal flame break open time. The sample is observed for melt dripping or falling droplets. A textile composite is considered as having "no melt-drip" when no falling droplets of melted material is observed during or after the completion of the test.

Self-Extinguishing Test

After the material sample is removed from the flame in the Horizontal Flame Test, above, the material is observed for any afterflame and afterflame time is recorded. If the sample exhibits any melt dripping or falling droplets, it is also recorded. If no afterflame is observed, or if an afterflame is observed upon removal but extinguishes within five (5) seconds after removal from the flame, the material is said to be self-extinguishing.

Vertical Flame Test for Textiles

Outer textile material samples were tested in accordance with ASTM D6413 test standard. Samples were exposed to flame for 12-seconds. Afterflame time was averaged for three (3) samples. Textiles with afterflame of greater than two (2) seconds were considered as flammable. Textiles having an afterflame of less than two (2) seconds are considered non-flammable.

Edge Ignition Test

Samples of textiles and textile composites were tested in accordance with ASTM D6413 test standard. Samples were exposed to flame for 12 seconds. Afterflame time and char length for an average of five (5) samples were recorded. A textile composite is considered as having "no melt-drip" when no falling droplets or melt dripping is observed during or after the completion of the test.

Surface Impingement Flame Test

The test is based on CAN/CGSB-4.2 test standard titled "Flame Resistance—Vertically Oriented Textile Fabric or Fabric Assembly Test". One modification to the test equipment was that the burner angle was 45 degrees to the vertical. The flame was impinged on the surface of the outer textile of the sample for 12 seconds and the sample was observed for the afterflame time, melt dripping, and evidence of hole formation in the sample. Reported results were the average of 3 samples.

Flammable Liquid Contamination Procedure

A textile composite sample measuring approximately (8 in×8 in) was placed on a flat horizontal surface with the outer meltable textile facing up. A pipette was used to evenly deposit approximately 15 drops of a flammable liquid contaminant in a center rectangular area measuring approximately 1 in×4 in. In this application, SAE 15W-40 motor oil (Mobil Delvac 1300 Super) was used. A (6 in×6 in) glass plate was placed over the contaminated area of the sample and a 3 lb weight was placed on the center of the glass plate. After 2 hours, the weight and the glass plate were removed. A test sample for testing as per Surface Impingement Flame Test was cut so that the majority of the contaminated area was contained in this sample.

Garment Flammability Test Method

Test garments were evaluated for resistance to a simulated flash fire exposure employing procedures similar to ASTM F 1930-00 Standard Test Method for Evaluation of Flame Resistant Clothing for Protection Against Flash Fire Simulations Using an Instrumented Manikin. Prior to testing, a nude manikin calibration was done with a four seconds exposure. After calibration, a cotton t-shirt (size 42 regular, weighing between 4 oz/yd$^2$ and 7 oz/yd$^2$) and a cotton short (size M) were put on followed by the jacket made of laminates described below (size 42 regular). In some tests, approximately 7.5 oz/yd$^2$, size 42 regular middle layer of clothing was put on the manikin between the cotton base layer and outer garment of this invention. After dressing the manikin, a sophisticated computer system was used to control the test procedure, to include the lighting of pilot flames, exposing the test garment to the flash fire, acquisition of data for 120-seconds, followed by running the exhaust fans to vent the chamber. Data acquired by the system was used to calculate the incident heat flux, predicted burn injury for each sensor during and after the exposure, and produce a report and graphics for each test. Any continued flaming after exposure was noted, and afterflame and melt dripping or falling of droplets was also noted. The predicted burn injury data along with afterflame and melt dripping observations is reported in Table 3. The predicted burn injury is calculated by dividing the total number of sensors that reach 2$^{nd}$ and 3$^{rd}$ degree burn by the number of sensors in the area covered by the test garment. The total percent body burn reported is the sum of the 2$^{nd}$ and 3$^{rd}$ degree predicted burn injury percentages.

Melting and Thermal Stability Test

The test was used to determine the thermal stability of textile materials. This test is based on thermal stability test as described in section 8.3 of NFPA 1975, 2004 Edition. The test oven was a hot air circulating oven as specified in ISO 17493. The test was conducted according to ASTM D 751, Standard Test Methods for Coated Fabrics, using the Procedures for Blocking Resistance at Elevated Temperatures (Sections 89 to 93), with the following modifications:

Borosilicate glass plates measuring 100 mm×100 mm×3 mm (4 in.×4 in.×⅛ in.) were used.

A test temperature of 265° C., +3/−0° C. (510° F., +5/−0° F.) was used.

The specimens were allowed to cool a minimum of 1 hour after removal of the glass plates from the oven.

Any sample side sticking to glass plate, sticking to itself when unfolded, or showing evidence of melting or dripping was considered as meltable. Any sample lacking evidence of meltable side was considered as thermally stable.

Moisture Vapor Transmission Rate (MVTR)

A description of the test employed to measure moisture vapor transmission rate (MVTR) is given below. The procedure has been found to be suitable for testing films, coatings, and coated products.

In the procedure, approximately 70 ml of a solution consisting of 35 parts by weight of potassium acetate and 15 parts by weight of distilled water was placed into a 133 ml polypropylene cup, having an inside diameter of 6.5 cm at its mouth. An expanded polytetrafluoroethylene (PTFE) membrane having a minimum MVTR of approximately 85,000 g/m²/24 hrs. as tested by the method described in U.S. Pat. No. 4,862,730 (to Crosby), was heat sealed to the lip of the cup to create a taut, leak proof, microporous barrier containing the solution.

A similar expanded PTFE membrane was mounted to the surface of a water bath. The water bath assembly was controlled at 23° C. plus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The MVTR of the sample was calculated from the weight gain of the cup assembly and was expressed in grams of water per square meter of sample surface area per 24 hours.

Weight

Weight measurements on materials were conducted as specified in ASTM D751, section 10.

Thickness Change Test

Samples were tested for initial thickness as per ASTM D751, section 9 with the exception that the pressure foot diameter was 1". The instrument was adjusted to apply a pressure force of approximately 3.4 psi to the specimen. After exposure to Horizontal Flame Test for 60 seconds (or after break-open if break-open occurred prior to 60 seconds), the sample was remeasured for thickness change. Thickness and integrity of the expanded structure were observed after testing.

Convective Barrier Thermal Stability Test (Air Permeability)

Preferably, a convective barrier has an air permeability after thermal exposure of less than 5 Frazier. To determine the thermal stability of a convective barrier, a 381 mm (15 in.) square specimen was clamped in a metal frame and then suspended in a forced air-circulating oven at 260° C. (500° F.). Following a 5-minute exposure, the specimen was removed from the oven. Specimens either melt dripping or showing hole formation during the oven exposure were not considered thermally stable convective barriers.

After allowing the specimen to cool down, the air permeability of the specimen was tested according to test methods entitled ASTM D 737-75. "Standard Test Method for Air Permeability Of Textile Fabrics." Specimens with less than 5 Frazier were considered as a thermally stable convective barrier.

Thickness of Convective Barrier

Convective barrier thickness was measured by placing the membrane between the two plates of a Kafer FZ1000/30 thickness snap gauge (Kafer Messuhrenfabrik GmbH, Villingen-Schwenningen, Germany). The average of three measurements was used.

Density of Convective Barrier

Samples die cut to form rectangular sections 2.54 cm by 15.24 cm were measured to determine their mass (using a Mettler-Toledo analytical balance Model AG204) and their thickness (using a Kafer FZ1000/30 snap gauge). Using these data, density was calculated with the following formula:

$$\rho = \frac{m}{w * l * t}$$

in which: $\rho$=density (g/cc); m=mass (g); w=width (cm); l=length (cm); and t=thickness (cm). The average of the three measurements was used.

TMA Expansion Test

TMA (Thermo-mechanical analysis) was used to measure the expansion of expandable graphite particles. Expansion was tested with TA Instruments TMA 2940 instrument. A ceramic (alumina) TGA pan, measuring roughly 8 mm in diameter and 12 mm in height was used for holding the sample. Using the macroexpansion probe, with a diameter of roughly 6 mm, the bottom of the pan was set the zero. Then flakes of expandable graphite (about 15 mg) about 0.1-0.3 mm deep, as measured by the TMA probe, were put in the pan. The furnace was closed and initial sample height was measured. The furnace was heated from about 25° C. to 600° C. at a ramp rate of 10° C./min. The TMA probe displacement was plotted against temperature; the displacement was used as a measure of expansion.

Furnace Expansion Test

A nickel crucible was heated in a hot furnace at 300° C. for 2 minutes. A measured sample (about 0.5 g) of expandable graphite was added to the crucible and placed in the hot furnace at 300° C. for 3 minutes. After the heating period, the crucible was removed from the furnace and allowed to cool and then the expanded graphite was transferred to a measuring cylinder to measure expanded volume. The expanded volume was divided by the initial weight of the sample to get expansion in cc/g units.

Flexibility or Hand Measurement

Hand measurements of textile composite samples were obtained using a Thwing-Albert Handle-o-meter, (model #211-5 from Thwing Albert Instrument Company, Philadelphia, Pa.). Lower values indicate lower load required to bend the samples and indicates more flexible sample.

DSC Endotherm Test

Tests were run on a Q2000 DSC from TA Instruments using Tzero™ hermetic pans. For each sample, about 3 mg of expandable graphite were placed in the pan. The pan was vented by pressing the corner of a razor blade into the center, creating a vent that was approximately 2 mm long and less than 1 mm wide. The DSC was equilibrated at 20° C. Samples were then heated from 20° C. to 400° C. at 10° C./min. Endotherm values were obtained from the DSC curves.

EXAMPLES

Thermally Stable Convective Barrier 1

Thermally Stable Convective Barrier 1 was constructed by treating ePTFE membrane (0.3 micron average pore size and 0.3 g/cc density) with a coating comprised of a fluoroacrylate polymer and carbon black as taught in U.S. Patent Application Publication No. 2007/0009679.

Thermally Stable Convective Barrier 2

A thermally stable convective barrier 2 was constructed by treating ePTFE film having 0.3 micron pore size and 0.45 g/cc density with a continuous, partially penetrated layer of 15 gsm of a breathable, moisture cured polyurethane in accordance with the teachings of U.S. Pat. No. 4,194,041. A second ePTFE membrane identical to the first was brought in contact with the polyurethane coated side of the aforementioned coated ePTFE and combined in a nip to form a tri-component ePTFE film. The film was partially cured in oven and then allowed to fully cure on a cardboard core at about >50% RH for 7 days Thermally Stable Convective Barrier 3

A barrier material was made according to the method of commonly owned U.S. Pat. No. 5,418,054A. Two layers of porous expanded polytetrafluoroethylene were laminated together by a flame-retardant adhesive layer of poly(urea-urethane) polymer containing phosphorus ester groups built into the chains of the polymer in about 12 gsm laydown. The resultant thermally stable convective barrier weighed about 46 gsm.

Polymer Resin (PR) 1

A flame retardant polyurethane resin was prepared by first forming a resin in accordance with the examples of commonly owned U.S. Pat. No. 4,532,316, and adding in the reactor a phosphorus-based additive (Antiblaze PR82) in an amount of about 20% by weight.

Polymer Resin (PR) 2

A flame retardant polyurethane resin was prepared by first forming a resin in accordance with the examples of commonly owned U.S. Pat. No. 4,532,316, and adding in the reactor a phosphorus-based additive in an amount of about 28% to get about 3% elemental phosphorus content by weight of the total resin mixture.

Polymer Resin-Expandable Graphite Mixture 1

A mixture of a polymer resin and expandable graphite was prepared by mixing about 20 gm of an expandable graphite (Grade 3626 from Asbury Graphite Mills, Inc having an expansion of greater than 900 μm upon heating to 280° C.) to about 80 gm of Polymer Resin (PR) 1. Mixing of expandable graphite flakes into the polymer resin was carried out at about 100° C. using a low shear hand mixer for at least 1 minute to ensure uniform dispersion.

Polymer Resin-Expandable Graphite Mixture 2

A mixture of polymer resin and expandable graphite was prepared by mixing about 5 gm of an expandable graphite (Grade 3626 from Asbury Graphite Mills, Inc) to about 95 gm of PR 1. Mixing was carried out as described above.

Polymer Resin-Expandable Graphite Mixture 3

A polymer resin prepared in accordance with U.S. Pat. No. 4,532,316. About 20 gm of an expandable graphite (Grade 3626 from Asbury Graphite Mills, Inc) was added to about 80 gm of polymer resin to get polymer resin-expandable graphite mixture 3. Mixing was carried out as described above.

Polymer Resin-Expandable Graphite Mixture 4

A polymer resin prepared in accordance with U.S. Pat. No. 4,532,316. About 20 gm of an expandable graphite (Grade Nyagraph 351 having an expansion of greater than 900 μm upon heating to 280° C. available from Nyacol Nano technologies, Inc., Ashland, Mass.) was added to about 80 gm of polymer resin to get polymer resin-expandable graphite mixture 4. Mixing was carried out as described above.

Polymer Resin—Ammonium Polyphosphate Mixture

A mixture was prepared by adding about 20 gm of ammonium polyphosphate (FR CROS C30 available from Flame Chk, Inc.) to about 80 gm of PR1. Mixing was carried out as described above.

Polymer Resin—Three Component Intumescent

A mixture was prepared by adding about 20 gm of commercially available three component chemical intumescent (Budit 3076 available from FlameChk, Inc.) to about 80 gm of PR1. Mixing was carried out as described above.

Polymer Resin-Expandable Graphite Mixture 5

A mixture was prepared by adding about 20 gm of expandable graphite (grade 3538 from Asbury Graphite Mills, Inc., having an expansion of less than 900 μm at 280° C.) to about 80 gm of PR1. Mixing was carried out as described above.

Waterproof Film 1

A commercially available waterproof breathable monolithic thermoplastic polyurethane film sold by Omniflex (Greenfield, Mass.) under part number 1540 was used.

Fabric Example 1

A textile comprising heat reactive material was prepared as follows. A 130 gsm nylon 6,6 knit outer textile (10) from Milliken Corporation, Spartanburg, S.C. (STYLE 755133) was coated with discrete dots of the polymer resin-expandable graphite mixture 1 by a gravure roller (at about 100° C. with a pressure of about 40 psi) in such a manner as to provide coverage of approximately 32 percent on the surface of the fabric, with a laydown of about 35 grams per square meter (gsm). The gravure roll had a round dot pattern with a cell depth about 1200 um, cell opening of about 2500 um, and a spacing of about 2500 um.

The coated fabric was allowed to cure at 50% RH and 23° C. for 48 hours.

Samples of the textile coated with the polymer resin-graphite mixture 1 were tested as per self extinguishing test described herein recorded an afterflame of less than 5 seconds.

Laminate Example 1

A laminate was made using a 95 gsm nylon 6,6 plain weave outer textile from Milliken (part number 131967) and thermally stable convective barrier 1, substantially as depicted in FIG. 2. The laminate was constructed by printing discrete dots of the Polymer Resin—Expandable Graphite Mixture 1 onto thermally stable convective barrier 1 and then adhering the 95 gsm nylon woven outer textile to the thermally stable convective barrier using a nip pressure of about 30 psi. The discrete dots of heat reactive material (20) were printed by a gravure roller as described above.

The resultant laminate was a two layer laminate of a thermally stable convective barrier and a nylon woven meltable outer textile layer bonded by dots of polymer resin-expandable graphite mixture 1. The laminate was taken up onto a steel drum under tension and allowed to cure for about 48 hours at greater than about 50% relative humidity.

Samples were tested according to MVTR, Horizontal Flame Test and Self-Extinguishing Test methods, described herein and reported in Table 1.

Laminate Example 2

A two layer laminate was made substantially according to Example 1, except that thermally stable convective barrier 2, described above, was used in place of thermally stable convective barrier 1

Samples were tested according to the Horizontal Flame Test and Self-Extinguishing Test methods, described herein and reported in Table 1.

Laminate Example 3

A laminate was prepared substantially as depicted in FIG. 4, and was made using a 130 gsm nylon 6,6 circular knit outer textile (10) from Milliken Corporation, Spartanburg, S.C. (STYLE 755133), and thermally stable convective barrier 1 (30). The laminate was constructed by printing discrete dots of polymer resin-expandable graphite mixture 1 onto the thermally stable convective barrier 1 (30) then adhering 130 gsm nylon 6,6 circular knit outer textile (10) to the thermally stable convective barrier 1 (30) using a nip. The gravure lamination process was carried out as described in laminate example 1. The resultant laminate was a two layer laminate of a thermally stable convective barrier and a nylon knit meltable face textile layer bonded by dots of polymer resin-expandable graphite mixture. The laminate was taken up onto a steel drum under tension and allowed to cure for about 48 hours at greater than about 50% relative humidity Samples were tested according to the Horizontal Flame Test and Self-Extinguishing Test methods, described herein and reported in Table 1.

Laminate Example 4

A laminate made substantially according to Example 3 was provided and PR1 was applied in a discrete dot pattern (about 15 gsm) to the exposed side of the thermally stable convective barrier (the side opposite the nylon woven textile), as depicted in FIG. 4. A 60 gsm aramid knit backer textile (50) (Part No. KRDZ602 from SSM Industries) was then adhered to the two layer laminate by feeding the two layer laminate with the PR1 dots and the aramid backer through an additional nip to form a three layer laminate. The three layer laminate was then taken up onto a steel drum under tension and allowed to cure for about 48 hours at greater than about 50% relative humidity.

Samples were tested according to the Horizontal Flame Test and Self-Extinguishing Test methods, described herein and reported in Table 1. Samples were also tested for flexibility as per hand test and showed good flexibility with hand result of 192.

Laminate Example 5

A three layer laminate was prepared substantially in accordance with Example 4, except that a 109 gsm Modacrylic/Cotton knit fabric (Part No. 05289 from United Knitting) was used as backer textile instead of the aramid knit backer textile.

Samples were tested according to the Horizontal Flame Test and Self-Extinguishing Test methods, described herein and reported in Table 1.

Laminate Example 6

A three layer laminate was made substantially in accordance with Example 4, except that a 80 gsm Polyester woven (Part No. US101 from Milliken Corporation) was used as the outer textile instead of a 130 gsm nylon 6,6 knit outer textile.

Laminate Example 7

A two layer laminate was prepared substantially in accordance with Example 2, except that Polymer resin-Expandable Graphite Mixture 2 was used instead of Polymer resin-Expandable Graphite Mixture 1.

Laminate Example 8

A two layer laminate was prepared substantially in accordance with Example 3, except that gravure roll print covered approximately 89% of thermally stable convective barrier 1 and Polymer resin—Expandable Graphite Mixture 4 was used.

Laminate Example 9

A three layer laminate was prepared substantially in accordance with Example 4, except that Polymer resin-Expandable Graphite 3 was used.

As shown in Table 1, the test results on Laminate Examples 1 through 9 show the present invention may achieve improved break-open time, substantially no afterflame, no melt dripping while providing good moisture vapor transmission rates. Additional examples described below were created to further explore the effect of laminate constructions and materials.

Example 10

A laminate was made using a 95 gsm nylon 6,6 plain weave outer textile from Milliken (part number 131967), and thermally stable convective barrier 1. The laminate was constructed by printing discrete dots of PR1 onto the thermally stable convective barrier 2 then adhering the 95 gsm nylon outer textile to the thermally stable convective barrier using a nip. The resultant laminate created was a two layer laminate of the thermally stable convective barrier (30) and the nylon woven meltable outer textile (10) bonded by PR1 (40). The laminate was taken up onto a steel drum under tension and allowed to cure for about 48 hours at greater than about 50% relative humidity.

Samples were tested according to the Horizontal Flame Test and Self-Extinguishing Test methods, described herein and reported in Table 1.

Example 11

A laminate was constructed in same manner as the laminate of Example 4, except that Polymer Resin-Ammonium Polyphosphate Mixture was used in place of active insulative material 1 when forming the two layer laminate portion of the three layer laminate.

Samples were tested according to the Horizontal Flame Test and Self-Extinguishing Test methods, described herein and reported in Table 1.

Example 12

A laminate was constructed in same manner as the laminate of Example 4, except that Polymer Resin-Three Component Intumescent Mixture was used instead of Polymer resin-Expandable Graphite Mixture 1 when forming the two layer laminate.

Samples were tested according to the Horizontal Flame Test and Self-Extinguishing Test methods, described herein and reported in Table 1. Samples were also tested for flexibility and hand value obtained was 198.

Example 13

A laminate was constructed in same manner as the laminate of Example 4, except that Polymer resin-Expandable Graphite Mixture 5 was used instead of Polymer resin-Expandable graphite Mixture 1 for making the two layer laminate portion of the three layer laminate.

Samples were tested according to the Horizontal Flame Test and Self-Extinguishing Test methods, described herein and reported in Table 1. Samples were also tested for flexibility and hand value obtained was 171.

Example 14

A laminate was constructed in same manner as Example 3, except that a waterproof breathable polyurethane film was used in place of thermally stable convective barrier 1. A commercially available breathable monolithic thermoplastic polyurethane film sold by Omniflex (Greenfield, Mass.) under part number 1540 was used.

Samples were tested according to the Horizontal Flame Test and Self-Extinguishing Test methods, described herein and reported in Table 1.

Example 15

Figure 8:
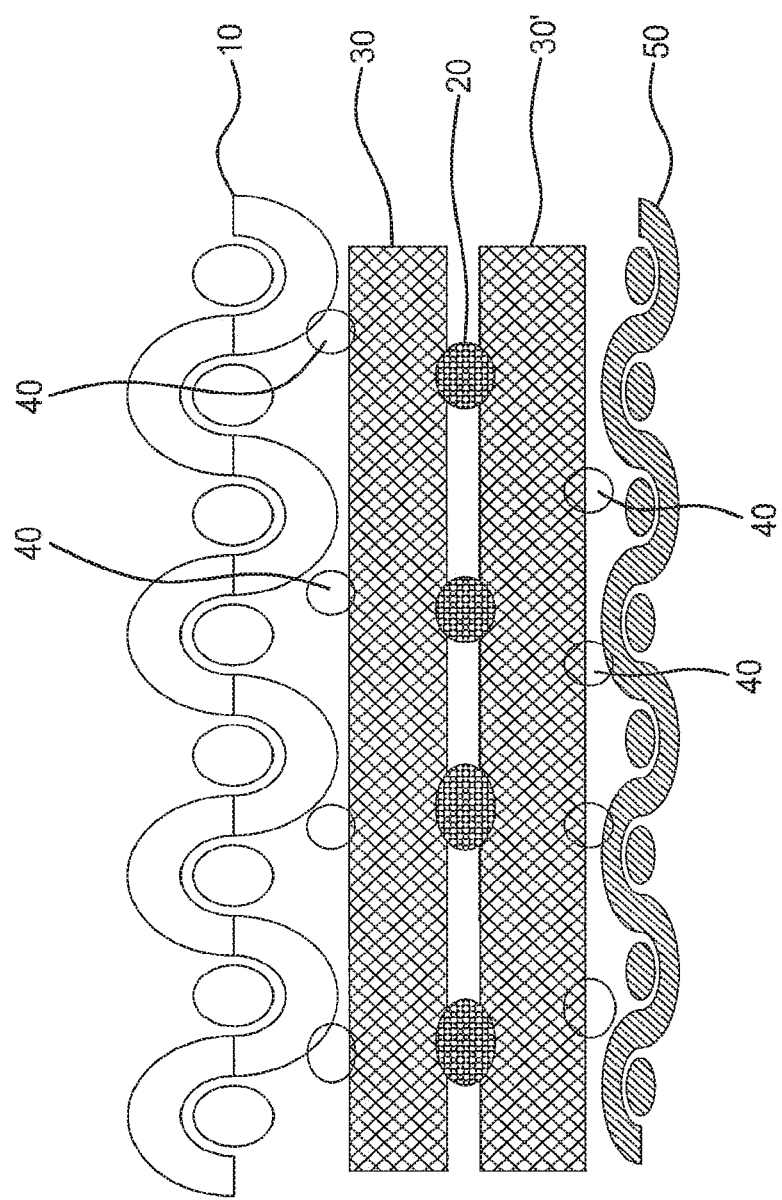
FIG. 8 is a schematic illustration of another embodiment described herein.

As depicted in FIG. 8, discrete dots of Polymer resin-Expandable graphite Mixture 1 (20) were printed on the exposed side of thermally stable convective barrier 1 (30') of example 10. An additional layer of thermally stable convective barrier 1 (30") was adhered to the convective barrier side of the two layer laminate by bringing the layers together in a nip. The gravure lamination was carried out substantially in the same manner as described in laminate example 1. The resulting exposed side of the second convective barrier 1 (30") was printed with discrete dots of PR1 (40) and adhered to 60 gsm Aramid knit backer textile (50). The resultant laminate was a four layer laminate which was allowed to cure for about 48 hours at greater than about 50% relative humidity.

Samples were tested according to the Horizontal Flame Test and Self-Extinguishing Test methods, described herein and reported in Table 1.

Example 16

A three layer laminate was prepared substantially according to the laminate of Example 4, except that PR1 was used to prepare the two layer laminate portion of the three layer laminate, while polymer resin-expandable graphite mixture 1 was used to convert 2 L into 3 L laminate.

TABLE 1

| Sample | Laydown (oz/yd2) | MVTR (g/m2/day) | Break Open Time (sec) | After-Flame* (sec) | Melt Drip |
|---|---|---|---|---|---|
| Laminate Example 1 | 1.2 | >8000 | >120 | 0 | No |
| Laminate Example 10 | — | >10000 | 6 | 20* | Yes |
| Laminate Example 2 | 1.0 | >7600 | >120 | 0 | No |

TABLE 1-continued

| Sample | Laydown (oz/yd2) | MVTR (g/m2/day) | Break Open Time (sec) | After-Flame* (sec) | Melt Drip |
|---|---|---|---|---|---|
| Laminate Example 3 | — | >9300 | >120 | 0 | No |
| Laminate Example 11 | 1.3 | >7500 | 21 | 20* | — |
| Laminate Example 12 | 1.3 | >11500 | 22 | 20* | — |
| Laminate Example 13 | 0.9 | >9500 | 31 | 20* | — |
| Laminate Example 14 | — | — | — | 3 | 20* | — |
| Laminate Example 15 | — | >7500 | 27 | 20* | Yes |
| Laminate Example 16 | — | — | — | 20* | — |
| Laminate Example 4 | 1.0 | >8900 | >120 | 0 | No |
| Laminate Example 5 | 1.0 | >10300 | >120 | 0 | No |
| Laminate Example 6 | — | — | >60 | 0 | No |
| Laminate Example 7 | — | — | >120 | 0 | No |
| Laminate Example 8 | 1.4 | >7800 | >120 | 0 | No |
| Laminate Example 9 | 0.9 | >9400 | >120 | 0 | No |

*Sample continued to burn and had to be extinguished.

Examples 17 Through 20

A series of examples were prepared using an alternate method. First a two layer laminate substantially comprising an ePTFE film and a 20 grams per square meter melt blown polyester non-woven was obtained from W. L. Gore and Associates, Inc. under part number NASZ100000C.

Next, a series of three layer laminates were constructed by laminating the two-layer laminate (NASZ100000C) to a second non-woven using a meltable adhesive web (part number PE2900 from Spufab, Ltd. Cuyahoga Falls, Ohio). The composition of each laminate made in accordance with this example is presented in Table 2. All of the three-layer laminates were produced in the following manner.

An amount of expandable graphite as indicated in the Table 2 was weighed and distributed evenly on the ePTFE surface of the two-layer laminate. An adhesive web weighing approximately 17 gsm was placed on top of the expandable graphite that was distributed on the two layer laminate. A second non-woven was placed over the adhesive web. Heat and pressure were applied to fuse the layers together at a temperature in excess of the adhesive melt temperature but below the expansion temperature of the graphite, approximately 163° C. and 40 psi for 15 seconds.

The Examples were tested for break-open time and after-flame time according to the methods described above. Comparison of Example 17 with Examples 18 and 19 shows the addition of expandable graphite has an improved break-open time; however, after-flame and melt dripping are inferior to Laminate Examples 1 through 9. The effect of construction method and materials is shown by comparison of Example 20 with Laminate Example 8. Both Example 20 and Laminate Example 8 have substantially the same lay down weight of the substantially the same expandable graphite; Laminate Example 8 has a longer break-open time, shorter after-flame, and no melt dripping.

TABLE 2

| Example No. | Expandable Graphite | Expandable Graphite Laydown (gsm) | Second Non-woven (Face) | Break-Open Time (sec) | After-flame Time (sec) | Melt Dripping |
|---|---|---|---|---|---|---|
| 17 | None | 0 | Nylon | 6 | 20* | Yes |
| 18 | ES100C10[1] | 4 | Nylon | 8 | 20* | Yes |

TABLE 2-continued

| Example No. | Expandable Graphite | Expandable Graphite Laydown (gsm) | Second Non-woven (Face) | Break-Open Time (sec) | Afterflame Time (sec) | Melt Dripping |
|---|---|---|---|---|---|---|
| 19 | ES100C10[1] | 8.5 | Nylon | 8.5 | 20* | Yes |
| 20 | Nyagraph 351[2] | 8.5 | Nylon | 14 | 20* | Yes |

20* indicates that the flame had to be extinguished
[1]Source ES100C10—Graphit Kropfmahl AG
[2]Nyagraph 351—Nyacol Nano technologies, Inc Ashland, MA Garment Flammability Tests on laminate jacket examples were conducted as per ASTM F1930-00 with heat flux of 2.0 cal/cm$^2$-sec. Ensemble lay-up was cotton-T shirt (weighing about 4.5 oz/yd$^2$) and shorts, NyCo (50/50 nylon/cotton) shirt and pants (weighing about 7.5 oz/yd$^2$), and the laminate jacket.

TABLE 3

| Example ID | Sample Description | % 2$^{ND}$ Degree Burn | % 3$^{rd}$ Degree Burn | Total Percent Body Burn (%) | Afterflame on Laminate | Melt Dripping |
|---|---|---|---|---|---|---|
| 21 | Laminate Example 21 Jacket | 9.7 | 27 | 37 | >120 sec | Yes |
| 22 | Laminate Example 4 Jacket | 0 | 0 | 0 | 1 sec | No |
| 23 | Laminate Example 5 Jacket | 1.4 | 0 | 1.4 | 4 sec | No |
| 24 | Laminate Example 4 Jacket tested without NyCo shirt and pants | 14 | 0 | 14 | 5 sec | No |

Examples 21-24

Example Jacket 21 was constructed using a three layer PTFE laminate (Part Number EXSH100050AZ available from W. L. Gore and Associates, Inc.) and without heat reactive material, and having the same meltable outer textile. Example Jackets 22, 23 and 24 were prepared from laminates made substantially according to Example 4 and Example 5. Each example jacket was tested under the Garment Flammability Test Method (such as that available at the test labs at North Carolina State University called Pyroman test) for Garment Flammability described above according to ASTM F1930-00 with heat flux of 2.0 cal/cm2-sec, for 4 second exposure as indicated in Table 3. Each example jacket was prepared so that the face textile faced direct flame exposure. Because jacket design may affect Garment Flammability Test performance, the jackets were designed so that zippers were covered from flame exposure. The Pyroman laminate jacket results shown in Table 3 indicate that the present invention may provide a percent body burn value that is 10 percentage points lower than a substantially similar jacket without the heat reactive material. The percent body burn value may be 20 percentage points lower than a substantially similar jacket without the heat reactive material. The ensemble as described herein shows a total predicted body burn of less than 20%. The afterflame may also be reduced by at least 100 seconds. The afterflame is reduced by at least 60 seconds. The afterflame is reduced by at least 30 seconds. The afterflame is reduced by at least 20 seconds. The afterflame is reduced by at least 10 seconds.

Laminate Examples 25-31

Two layer laminates were prepared with several different expandable graphites all having expansion greater than 9 cc/g, but having different endotherms. Sample laminates were tested for afterflame and char length (tested according to the Edge Ignition Test for Composites. Graphite expansion was calculated according to the Furnace Expansion Test and endotherm was tested according to the DCS Endotherm Test for each graphite used, the results of which are reported in Table 4.

The samples of two layer laminates were prepared by the lamination technique as taught in Laminate Example 1 by printing discrete dots of polymer resin encapsulated expandable graphite on Thermally Stable Convective Barrier 3 and then adhering a 70 gsm Nylon 6,6 plain weave outer textile from Milliken (Style 130975) to Thermally Stable Convective Barrier 3 with the dots of polymer resin encapsulated expandable graphite between the two layers. The polymer resin used in these examples was PR2 and the expandable graphite materials shown in Table 4 were mixed in PR2 at 25 wt % level.

TABLE 4

| Laminate Example | Expandable Graphite ID | Furnace Expansion (cc/g) | Endotherm (J/g) | Afterflame (s) | Char Length (cm) |
|---|---|---|---|---|---|
| 25 | Nyagraph 200[1] | 26 | 48 | 26.7 | 28 |
| 26 | 7814C[4] | 14 | 57 | 28.7 | 27.8 |
| 27 | 3626 | 19 | 65 | 24.9 | 26 |
| 28 | Nyagraph 801H[1] | 30 | 78 | 25.6 | 25.0 |
| 29 | Carbofoil PU 90[2] | 14 | 214 | 17.0 | 17.6 |
| 30 | Grafguard 160-80N[3] | 29 | 250 | 1.4 | 5.8 |
| 31 | Carbofoil PU 200[2] | 22 | 267 | 0.72 | 8.1 |

[1]Nyagraph 200 and 801H (Nyacol Nano technologies, Inc Ashland, MA)
[2]Carbofoil PU-90 and PU-200 (Metachem Manufacturing Company Pvt Ltd., Pune, India)
[3]Grafguard 160-80N (Graftech Inc., Lakewood, OH)
[4]7814C (Superior Graphite, Chicago, IL)

As reported in Table 4, laminate samples of Examples 29-31 made with polymer resin encapsulated expandable graphite having an endotherm greater than 100 J/g performed better in the Edge Ignition Test for Composites, having both shorter afterflame and char length, compared to laminate samples of Examples 25-28, made with polymer resin encapsulated expandable graphite having an endotherm greater than 100 J/g. Samples of laminates made with polymer resin encapsulated graphite having an endotherm greater than 100 J/g had an afterflame as low as less than one second (Example 31) and a char length less than 6 cm (Example 30), compared with laminate samples made with graphite having endotherms less than 100 J/g, having an afterflame as long as almost 29 seconds (Example 26) and a char length as long as 28 cm (Example 25).

Laminate Examples 32-33

Laminates were constructed using gravures providing different surface coverages and tested for afterflame and hole formation.

Laminate 32 was constructed using a gravure having a discrete dot pattern, a surface coverage of 89% and pitch of 567 microns by applying polymer resin encapsulated expandable graphite mixture on Thermally Stable Convective Barrier 3. A nylon (70 gsm Nylon 6,6 plain weave) outer textile from Milliken (Style 130975) was adhered to the thermally stable convective barrier by the polymer resin encapsulated graphite mixture. Laminate 33 was constructed with the same components and method but using a gravure having discrete dot pattern, a surface coverage of 51% and pitch of 2100 microns.

The polymer resin used in these examples was PR2. The expandable graphite material was 7814C with a particle size between 90-150 microns, and was mixed in PR2 at 25 wt % level. Both Examples 32 and 33 laminates had a laydown of polymer resin encapsulated expandable graphite mixture of about 38 g/m².

When tested as per the Surface Impingement Test, even though both laminates had the same laydown of the polymer resin encapsulated expandable graphite mixture, Laminate 32 which had coverage over a greater surface area (89%) performed worse, exhibiting afterflame time of greater than 30 seconds and also hole formation. Laminate 33, which had a surface coverage of only 51%, exhibited afterflame of less than 10 seconds and without any hole formation.

Laminate Examples 34-36 and Fabric Example 2

Laminates were made with a meltable and non-flammable outer textile and tested according to the Edge Ignition test.

Laminates were constructed using a 4 oz/yd² plain weave textile made with Trevira® CS yarns. Laminate 34 was constructed by printing discrete dots of PR2 (with no expandable graphite) on Thermally Stable Convective Barrier 3 and adhering the meltable, non-flammable fabric to the dots. Laminate 35 was constructed in the same manner as Laminate 34 except using PR2 and 25 wt % of 7814C expandable graphite as the heat reactive material. Laminate 36 was constructed in the same manner as Laminate 33 except using PR2 and 25 wt % of Grafguard 160-80N expandable graphite as the heat reactive materials.

The laminates were tested as per the Edge Ignition flame test and results are shown in Table 5 below. In a further comparison, the same meltable, non-flammable Trevira® CS textile without being formed as a laminate and without polymer resin-expandable graphite mixture, and when tested as per Edge Ignition flame test showed less than 1 second afterflame and 8.9 cm char length and no melt drip.

TABLE 5

| Example | Afterflame Time (second) | Char Length (cm) | Melt Drip |
| --- | --- | --- | --- |
| Trevira ® CS | 0.1 | 8.9 | No |
| Laminate 34 | 10.5 | 11 | Yes |
| Laminate 35 | 0.4 | 5 | No |
| Laminate 36 | 0.4 | 3.9 | No |

Laminate Examples 37-38

Laminates were prepared with meltable flammable and non-meltable, non-flammable outer textiles and thermal convective barrier, and then contaminated with motor oil (SAE 15W-40 Mobil Delvac) and tested for afterflame and hole formation.

Laminate 37 was made using a 3.3 oz/yd2 Nomex IIIA plain weave face fabric, and Thermally Stable Convective Barrier 3. The laminate was constructed as taught in laminate Example 1 by printing discrete dots of polymer resin (PR2) (without expandable graphite) onto thermally stable convective barrier and adhering to the Nomex fabric. Another laminate 38 was prepared essentially the same manner except that PR2 was replaced with a mixture of polymer resin expandable graphite. The polymer resin in this example was PR2, and the polymer resin-expandable graphite mixture comprised 25 wt % Grafguard 160-80N. These two Nomex-based laminates and the Nylon based laminate from Laminate Example 30 were contaminated with motor oil as per the Flammable Liquid Contamination Procedure and tested as per Surface Impingement Flame Test. The results are presented in Table 6.

TABLE 6

| Laminate Example | Afterflame Time (seconds) | Hole Formation |
| --- | --- | --- |
| Laminate 37 | 0 | not recorded |
| Laminate 38 | 0 | No |
| Laminate 30 | 0 | No |
| Laminate 37 after contamination | 25 | Yes |
| Laminate 38 after contamination | 11 | No |
| Laminate 30 after contamination | 0 | No |

Laminate samples having a flammable meltable outer textile performed approximately the same and laminate samples having a non-meltable, non-flammable outer textile when tested for afterflame and hole formation. However, once contaminated with motor oil, the laminates having a meltable flammable outer textile performed better than the laminates having a non-meltable, non-flammable (Nomex) outer textile when tested for afterflame and hole formation.

While particular embodiments of the present invention have been illustrated and described herein, the present invention should not be limited to such illustrations and descriptions. It should be apparent that changes and modifications may be incorporated and embodied as part of the present invention.

The invention claims is:

1. A garment comprising:
    a thermally protective laminate comprising:
        a flammable, meltable outer textile;
        a thermally stable textile backer, and
        a heat reactive material positioned between the flammable, meltable outer textile and the thermally stable textile backer;
        wherein the heat reactive material is configured to bond the flammable, meltable outer textile to the thermally stable textile backer and
        wherein the heat reactive material comprises a polymer resin-expandable graphite mixture of:
            (i) a crosslinked polymer and
            (ii) an expandable graphite,
    wherein the garment defines:
        (i) an enclosed inner area configured for a user and
        (ii) an exterior area outside of the garment, and
    wherein the thermally protective laminate is oriented such that the flammable, meltable outer textile is exposed to the exterior area outside of the garment and the thermally stable textile backer is positioned opposite the flammable, meltable outer textile.

2. The garment of claim 1, wherein the heat reactive material is in the form of a pattern of printed discontinuous dots, lines or grids.

3. The garment of claim 1, wherein the heat reactive material has a surface coverage between 30% and 80%.

4. The garment of claim 1, wherein the heat reactive material is in a pattern of discrete dots.

5. The garment of claim 4, wherein the pattern has a pitch between 500 μm and 6000 μm.

6. The garment of claim 1, wherein the thermally protective laminate is waterproof and has a moisture vapor transmission rate (MVTR) greater than 1000 $g/m^2$/24 hours.

7. The garment of claim 1, wherein the expandable graphite has an endotherm of greater than 100 J/g.

8. The garment of claim 1, wherein the thermally protective laminate has a char length of less than 20 cm when tested according to the Edge Ignition Test.

9. The garment of claim 1, wherein the flammable, meltable outer textile is selected from a polyamide and a polyester.

10. The garment of claim 1, wherein the thermally stable textile backer is selected from the group consisting of aramids, flame resistant cottons, flame resistant rayon, modacrylic blends and combinations thereof.

11. The garment of claim 1, wherein a weight of the thermally protective laminate is less than 15 $oz/yd^2$.

12. The garment of claim 1, wherein the thermally protective laminate exhibits an afterflame of less than 20 seconds when tested according to the Edge Ignition Test.

13. The garment of claim 1, wherein the expandable graphite expands at a temperature below a pyrolysis temperature of the meltable outer textile.

\* \* \* \* \*